United States Patent [19]
Schut

[11] 3,716,538
[45] Feb. 13, 1973

[54] AMINOMETHYLPHENYLBICYCLONONENOLS

[75] Inventor: Robert Norman Schut, Edwardsburg, Mich.

[73] Assignee: Miles Laboratories, Inc., Elkhart, Ind.

[22] Filed: Sept. 9, 1970

[21] Appl. No.: 70,884

[52] U.S. Cl. ......260/268 BC, 260/514 B, 260/563 P, 260/570.8, 260/999
[51] Int. Cl. .............................................C07d 51/70
[58] Field of Search ...260/268 PH, 268 BC, 570.8 R, 260/584 R, 563 P

[56] References Cited

UNITED STATES PATENTS

| | | | |
|---|---|---|---|
| 3,108,998 | 10/1963 | Poos | 260/268 BC |
| 3,146,235 | 8/1964 | Nichols | 260/268 PH |
| 3,354,161 | 11/1967 | Schut | 260/268 BC |

OTHER PUBLICATIONS

Gaylord "Reduction with Complex Metal Hydrides" Interscience, 1956, p. 554–555.

*Primary Examiner*—Donald G. Daus
*Attorney*—Joseph C. Schwalbach, Louis E. Davidson and Harry T. Stephenson

[57] ABSTRACT

Certain aminomethyl-9-phenylbicyclo[3.3.1]-non-3-en-9-ols and acid addition salts thereof as well as methods for their preparation are disclosed. These compounds exhibit analgesic and tranquilizer activity.

4 Claims, No Drawings

AMINOMETHYLPHENYLBICYCLONONENOLS

SUMMARY OF THE INVENTION

The compounds of this invention have the formula:

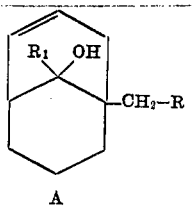

A wherein R is 4-phenyl-1-piperazyl, diloweralkylamino in which the alkyl group contains from one to four carbon atoms and N-methyl -N-phenethylamino and $R_1$ is phenyl. When these compounds or their pharmacologically acceptable acid addition salts are injected subcutaneously into an animal at a dosage of from 30 to 100 mg/kg of body weight, both analgesic and tranquilizing effects are observed.

These compounds can be readily prepared as shown by the following equations where R and $R_1$ are as previously defined:

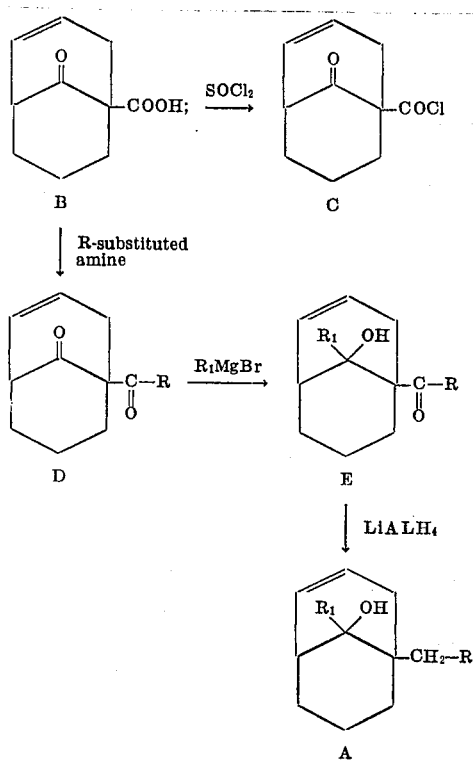

Thus, the known carboxylic acid B is converted to the acid chloride C by refluxing with thionyl chloride. The solution is concentrated under vacuum and the residue transformed to the ketoamide D by reaction with the appropriate R-substituted amine in aqueous alkali under reflux conditions. This intermediate is then reacted with phenyl magnesium bromide in an inert solvent such as tetrahydrofuran to obtain compound E which is reduced with lithium aluminum hydride to form the substituted aminoalcohol A as the free base which can be converted to an acid addition salt by reaction with such acids as hydrochloric, hydrobromic, maleic and the like in an inert solvent such as acetone, propyl alcohol or ethyl acetate. The precise conditions employed to produce the specific compounds encompassed within the scope of this invention are set forth in the examples which follow.

PREFERRED EMBODIMENTS OF THE INVENTION

EXAMPLE 1

R is 4-phenyl-1-piperazyl in formula A and $R_1$ is phenyl

A 1.8 gram (0.01 mole) sample of 9-oxobicyclo[3·3.1] non-3-en-1-carboxylic acid (m.p. = 134°C.) was dissolved in 10 ml. of thionyl chloride and heated under reflux for 30 minutes. The solution was concentrated under vacuum to yield 2.03 grams of the corresponding carbonyl chloride as a yellow oil. A sample of 57.9 grams of said chloride in 200 ml. of ether was added to a stirred mixture of 50 grams (0.31 mole) of N-phenyl-piperazine in 400 ml. of ether and 200 ml. of 20 percent aqueous sodium hydroxide solution. The addition was carried out rapidly enough to maintain reflux and stirring was continued thereafter at room temperature for 25 minutes. The organic layer which formed was separated, washed with water, dried and concentrated under vacuum. The syrupy residue was crystallized from ether to obtain 63 grams of 1-(4-phenyl-1-piperazyl)-carbonylbicyclo[3·3.1]non-3-en- 9-one as a white solid melting at 127°C. after recrystallization from aqueous isopropyl alcohol.

To a stirred solution of 5.71 grams (0.026 mole) of phenyl magnesium bromide was added 6.48 grams (0.020 mole) of the 1-(4-phenyl-1-piperazyl)carbonyl-bicyclo[3·3.1]non-3-en-9-one thus prepared in 150 ml. of dry tetrahydrofuran. The solution was stirred under reflux for 3 hours and the organic salt was decomposed by adding ammonium chloride solution. The solvent was evaporated, chloroform added and the extract dried to yield a solid residue which after recrystallization from methanol-acetone weighed 7.32 grams and melted at 193°C. Upon analysis, this intermediate 1-(4-phenyl-1-piperazyl)carbonyl-9-phenylbicyclo[3·3.1]non-3-en-9-ol contained 7.08 percent nitrogen compared to the calculated value of 6.97 percent nitrogen.

To a suspension of 3 grams of lithium aluminum hydride in 100 ml. of tetrahydrofuran was added 6.22 grams (0.015 mole) of the above prepared intermediate in 100 ml. of the same solvent and the mixture was stirred under reflux overnight. The excess hydride was decomposed and aqueous sodium hydroxide solution was added until a precipitate formed. The solvent layer was separated and concentrated. The residue was re-crystallized from ether to yield 5.33 grams (89 percent) of the desired 1-(4-phenyl-1-piperazyl)methyl-9-phenylbicyclo[3·3.1]non-3-en-9-ol as a white solid which melted at 131°C. and contained 7.20 percent nitrogen compared to 7.22 percent nitrogen calculated.

A 10-gram sample of the free base thus prepared was dissolved in 200 ml. of ethyl acetate and treated with 9.3 ml. of 2.77 normal HCl. The hydrochloride was collected and recrystallized from methanol-ether to yield 7.19 grams of said salt melting at 251°C.

EXAMPLE 2

R is dimethylamino in formula A and $R_1$ is phenyl

The reaction of 18 grams (0.094 mole) of the acid chloride prepared in Example 1 with 8.47 grams (0.133 mole) of dimethylamine in ether and aqueous sodium hydroxide according to the method described in Example 1 resulted in the isolation of 16 grams of 1-dimethylaminocarbonylbicyclo[3·3.1]non-3-en-9-one as a viscous oil which was reacted with phenyl magnesium bromide as set forth in Example 1 to produce a 97 percent yield of the corresponding amide alcohol melting at 180°C. after recrystallization from aqueous acetone. Reduction of said amide alcohol with lithium aluminum hydride according to the procedure previously described in Example 1 produced the desired 1-dimethyl-aminomethyl-9-phenylbicyclo[3·3.1]non-3-en-9-ol in 73 percent yield as a clear liquid boiling at 140°C. at 2mm. pressure. Nitrogen found was 5.08 percent versus nitrogen calculated of 5.17 percent.

Treatment of 11 grams of the free base thus prepared with 4.6 grams of maleic acid in acetone produced the solid maleate which after recrystallization from acetone-ether melted at 156°C.

EXAMPLE 3

R is N-methyl-N-phenethylamino and $R_1$ is phenyl in formula A

The reaction of the acid chloride prepared in Example 1 with N-methyl-N-phenethylamine as previously described produced 1-(N-methyl-N-phenethylamino)carbonylbicycloi53·3.1]non-3-en-9-one in 83 percent yield as a viscous oil which upon reaction with phenyl magnesium bromide according to the procedure of Example 1 formed the corresponding 9-ol derivative as a white solid melting at 100°C. after recrystallization from 2-propanol. Reduction of this intermediate with LiAlH₄ as described in the procedure of Example 1 produced a 76 percent yield of 1-(N-methyl-N-phenethylamino)methyl-9-phenylbicyclo[3·3.1]non-3-en-9-ol as a clear liquid with a boiling point of 210°C. at 0.5 mm. pressure. Crystallization of the distilled sample from a hydrocarbon fraction boiling at 30°C. provided a white solid melting at 76°C. From this free base, the maleate was formed by reaction of maleic acid in ethyl acetate and found to melt at 141°C. The nitrogen content of 2.94 percent corresponded to the calculated value.

By substituting the dimethylamine of Example 2 with other diloweralkylamines such as diethylamine, di-isopropylamine and di-n-butylamine, the corresponding compounds of formula A are produced in which R is diethylamino, di-isopropylamino and di-n-butylamino, respectively and $R_1$ is phenyl.

What is claimed is:

1. A compound of the formula

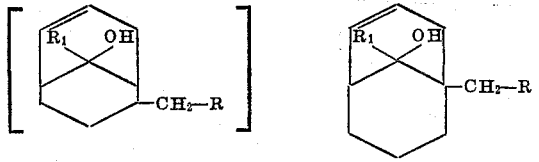

in which $R_1$ is phenyl, R is a member of the group consisting of 4-phenyl-1-piperazyl, diloweralkylamino, and N-methyl-N-phenethyl-amino and pharmaceutically acceptable acid addition salts thereof.

2. A compound as in claim 1 in which R is 4-phenyl-1-piperazyl and $R_1$ is phenyl.

3. A compound as in claim 1 in which R is dimethylamino and $R_1$ is phenyl.

4. A compound as in claim 1 in which R is N-methyl-N-phenethylamino and $R_1$ is phenyl.

* * * * *

UNITED STATES PATENT OFFICE
CERTIFICATE OF CORRECTION

Patent No. 3,716,538   Dated March 2, 1973

Inventor(s) Robert Norman Schut

It is certified that error appears in the above-identified patent and that said Letters Patent are hereby corrected as shown below:

Column 3, line 28, "phenethylamino)carbonylbicycloi53˙3.1]non-3-en-9-" should read --phenethylamino)carbonylbicyclo[3.3.1]non-3-en-9- --.

Claim 1, the structure and brackets appearing as

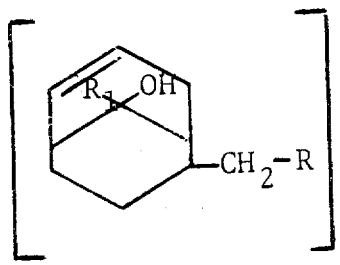

should be deleted.

Signed and sealed this 3rd day of July 1973.

(SEAL)
Attest:

EDWARD M. FLETCHER, JR.
Attesting Officer

Rene Tegtmeyer
Acting Commissioner of Patents